(12) United States Patent
Sotani et al.

(10) Patent No.: US 7,648,010 B2
(45) Date of Patent: Jan. 19, 2010

(54) STARTING CLUTCH

(75) Inventors: Hiroshi Sotani, Saitama (JP); Hiromi Sumi, Saitama (JP); Kinya Mizuno, Saitama (JP); Yasushi Fujimoto, Saitama (JP); Masako Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 11/642,917

(22) Filed: Dec. 21, 2006

(65) Prior Publication Data

US 2007/0144859 A1  Jun. 28, 2007

(30) Foreign Application Priority Data

Dec. 26, 2005 (JP) .............................. 2005-373287

(51) Int. Cl.
  *F16D 47/00* (2006.01)
(52) U.S. Cl. .................................................. 192/48.4
(58) Field of Classification Search ....................... None
  See application file for complete search history.

(56) References Cited

U.S. PATENT DOCUMENTS 7,421,985 B2 * 9/2008 Fujimoto et al. .......... 123/41.44
2007/0095306 A1 * 5/2007 Fujimoto et al. .......... 123/41.63
2007/0101952 A1 * 5/2007 Fujimoto et al. .......... 123/41.44

FOREIGN PATENT DOCUMENTS

JP 2002-48150 A 2/2002

* cited by examiner

*Primary Examiner*—Dirk Wright
(74) *Attorney, Agent, or Firm*—Birch, Stewart, Kolasch & Birch, LLP

(57) ABSTRACT

A starting clutch includes a clutch inner that is secured to and supported by a drive plate boss fitted to a crankshaft near the end thereof. A one-way clutch is fitted to the outer periphery of the cylindrical portion extending inwardly. A clutch outer forms an annular portion that covers the outer periphery of the drive plate. A hollow disk portion covers the inner surface and is rotatably supported by the crankshaft. The one-way clutch is clamped by the inner peripheral edge of the hollow disk portion of the clutch outer from the outer peripheral side in cooperation with the cylindrical portion of the drive plate boss, and the inner peripheral edge of the hollow disk portion of the clutch outer abuts against a flange portion of the drive plate boss extending along the inner surface of the drive plate in the centrifugal direction thereof.

20 Claims, 6 Drawing Sheets

STARTING CLUTCH

CROSS-REFERENCE TO RELATED APPLICATIONS

The present application claims priority under 35 USC 119 to Japanese Patent Application No. 2005-373287 filed on Dec. 26, 2005 the entire contents of which are hereby incorporated by reference.

BACKGROUND OF THE INVENTION

1. Field of the Invention

The present invention relates to a starting clutch provided coaxially mounted on a crankshaft and being capable of transmitting a motive power of the crankshaft to a transmission device via a gear.

2. Description of Background Art

A starting clutch is known wherein an automatic centrifugal clutch includes a clutch inner fitted integrally with the crankshaft and a clutch outer rotatably supported by the crankshaft that come into and out of contact with each other according to a rotational speed.

For example, a clutch device disclosed in JP-A-2002-48150 is illustrated in FIG. 6 wherein a clutch inner 02 is configured in such a manner that a disk-shaped drive plate 04 is secured and supported to a drive plate boss 03 which is fitted to a portion of a crankshaft 01 near an end thereof. A clutch shoe 06 is provided on a pin 05 projecting from the drive plate 03 so as to be capable of swinging by way of a centrifugal force.

On the other hand, a clutch outer 010 includes a clutch housing 012 which forms a cup shape by an annular portion which covers the outer periphery of the drive plate 04 and a hollow disk portion which covers the center side of the side surface of the crankshaft. A cylindrical clutch outer boss 011 holds the clutch housing 011 integrally and is rotatably fitted on the crankshaft 01.

A one-way clutch 020 is interposed between a cylindrical portion 03a of the drive plate boss 03 of the clutch inner 02 which extends toward the center side of the crankshaft and an opening cylindrical portion 011a of the clutch outer boss 011 of the clutch outer 010.

An end edge of a bearing cylindrical portion 011b of the clutch outer boss 011 which is rotatably fitted to the crankshaft 01 continues from the opening cylindrical portion 011a having a large diameter via a shoulder portion 011c.

Therefore, the portion of the clutch inner 02, being fitted to the crankshaft and integrally fixed thereto, which receives a thrust force of the clutch outer 010 in the axial direction thereof is the drive plate boss 03 of the clutch inner 02, and the opened end surface of the bearing cylindrical portion 011b of the clutch outer 010 comes into abutment with the opened end surface of the cylindrical portion 03a of the drive plate boss 03 which is opposed thereto to receive the thrust.

Since the thrust receiving surface of the cylindrical portion 03a of the drive plate boss 03 is located on a relatively smaller diameter portion thereof which is on the axial center side with respect to the one-way clutch 020, it is necessary to increase the outer diameter of the cylindrical portion 03a of the drive plate boss 03 in order to secure a sufficient surface area for receiving the thrust.

Therefore, the diameter of the one-way clutch 020 is increased. Thus, the size of the entire internal combustion engine is also affected.

SUMMARY AND OBJECTS OF THE INVENTION

In view of such circumstances, it is an object of an embodiment of the invention to provide a starting clutch which can restrain upsizing of the internal combustion engine by maintaining a cylindrical portion of the drive plate boss which supports the one-way clutch from inside to be small in diameter.

In order to achieve the above-described object, according to an embodiment of the present invention, a starting clutch is provided coaxially with the crankshaft and is capable of transmitting a motive power of the crankshaft to a transmission via a gear. A disk-shaped drive plate of a clutch inner is secured to and supported by a drive plate boss which is fitted to the crankshaft near the end thereof. A one-way clutch is fitted to the outer periphery of the cylindrical portion extending inwardly, which corresponds to the center side of the crankshaft of the drive plate boss, wherein a clutch outer forms a cup shape by an annular portion which covers the outer periphery of the drive plate and a hollow disk portion is provided which covers the inner surface that is rotatably supported by the crankshaft. The one-way clutch is clamped by the inner peripheral edge of the hollow disk portion of the clutch outer from the outer peripheral side in cooperation with the cylindrical portion of the drive plate boss. The inner peripheral edge of the hollow disk portion of the clutch outer abuts against the flange portion of the drive plate boss extending along the inner surface of the drive plate in the centrifugal direction thereof.

According to an embodiment of the present invention, a clutch shoe is supported by a pin projecting from the drive plate so as to penetrate therethrough from the inner side, which corresponds to the center side of the crankshaft, to the outer side of the crankshaft. The flange portion extending from the drive plate boss in the centrifugal direction is formed with a notch at the outer peripheral edge thereof so as to avoid a head portion of the pin slightly projecting inwardly of the drive plate.

According to an embodiment of the present invention, the clutch outer is configured in such a manner that the inner peripheral portion of the hollow cup-shaped clutch housing is integrally secured to the cylindrical clutch outer boss. In addition, the outer cylindrical portion of the clutch outer boss corresponds to the inner peripheral edge of the hollow disk portion of the clutch outer. The outer end surface of the outer cylindrical portion of the same clutch outer boss and the outer surface of the hollow disk portion of the clutch housing are flush with each other.

According to an embodiment of the present invention, the gear shift clutch provided on a main shaft of the transmission device extends in parallel to the crankshaft and is disposed along the inner surface of the hollow disk portion of the clutch outer. The gear shift clutch and the clutch outer is partly overlapped with each other when viewed in the axial direction.

According to an embodiment of the present invention, since the inner peripheral edge of the hollow disk portion of the clutch outer on the radially outside with respect to the one-way clutch comes into abutment with the flange portion of the drive plate boss extending in the centrifugal direction along the inner surface of the drive plate, it is not necessary to increase the outer diameter of the cylindrical portion of the drive plate boss on the radially inside with respect to the one-way clutch, so that upsizing of the internal combustion engine can be restrained by reducing the diameter of the one-way clutch and the inner peripheral edge of the clutch outer.

The side of the center of the crankshaft is referred to as the inside and the opposite side thereof is referred to as the outside.

According to an embodiment of the present invention, since the flange portion extending from the drive plate boss in the centrifugal direction is formed at the outer peripheral edge with a notch so as to avoid the head portion of the pin which supports the clutch shoe, downsizing of the clutch inner is achieved by providing the pin for supporting the clutch shoe at a position closer to the center of the shaft. Thus, a weight reduction of the drive boss can also be achieved.

According to an embodiment of the present invention, since the outer end surface of the outer cylindrical portion of the clutch outer boss and the outer surface of the hollow disk portion of the clutch housing are flush with each other, the clutch outer can be positioned closer to the drive plate of the clutch inner so that the axial width of the starting clutch can be reduced. Thus, the starting clutch can be downsized.

According to an embodiment of the present invention, since the gear shift clutch is arranged along the inner surface of the hollow disk portion of the clutch outer, and is partly overlapped with the clutch outer when viewed in the axial direction, the main shaft can be positioned closer to the crankshaft without interference of the gear shift clutch with the inner peripheral edge of the clutch outer, which is reduced in diameter. Thus, downsizing of the internal combustion engine can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to FIG. 1 to FIG. 5, an embodiment of the invention will be described below.

A power transmission device for a vehicle including a starting clutch C according to the invention applied thereto and a gear transmission M constitutes a power unit P which is to be mounted to a rough-terrain saddle-type vehicle as a vehicle together with an internal combustion engine E as an engine.

Figure 1:
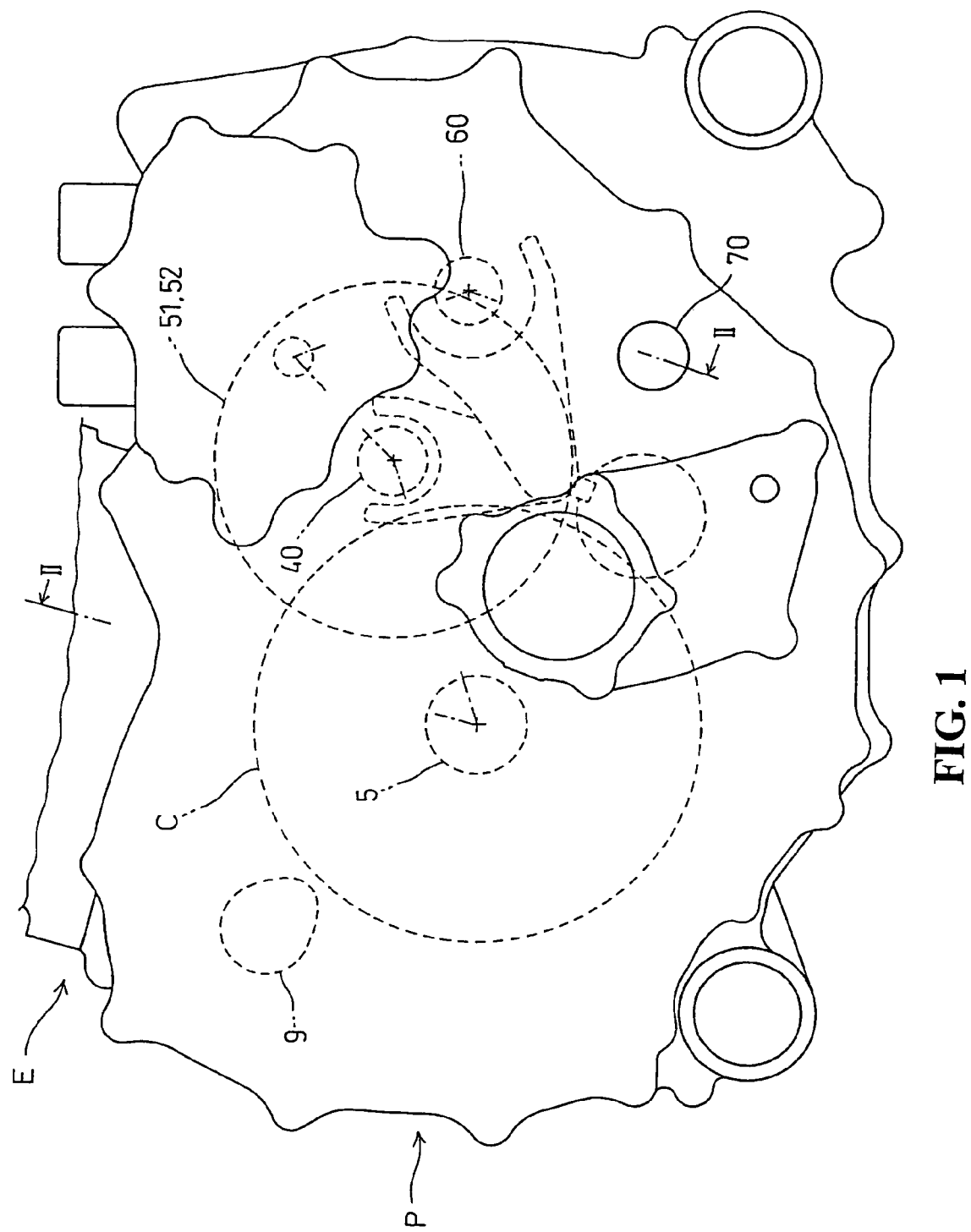
FIG. 1 is a general front view of a principal portion of a power unit to which a starting clutch according to an embodiment of the invention is applied.
Figure 2:
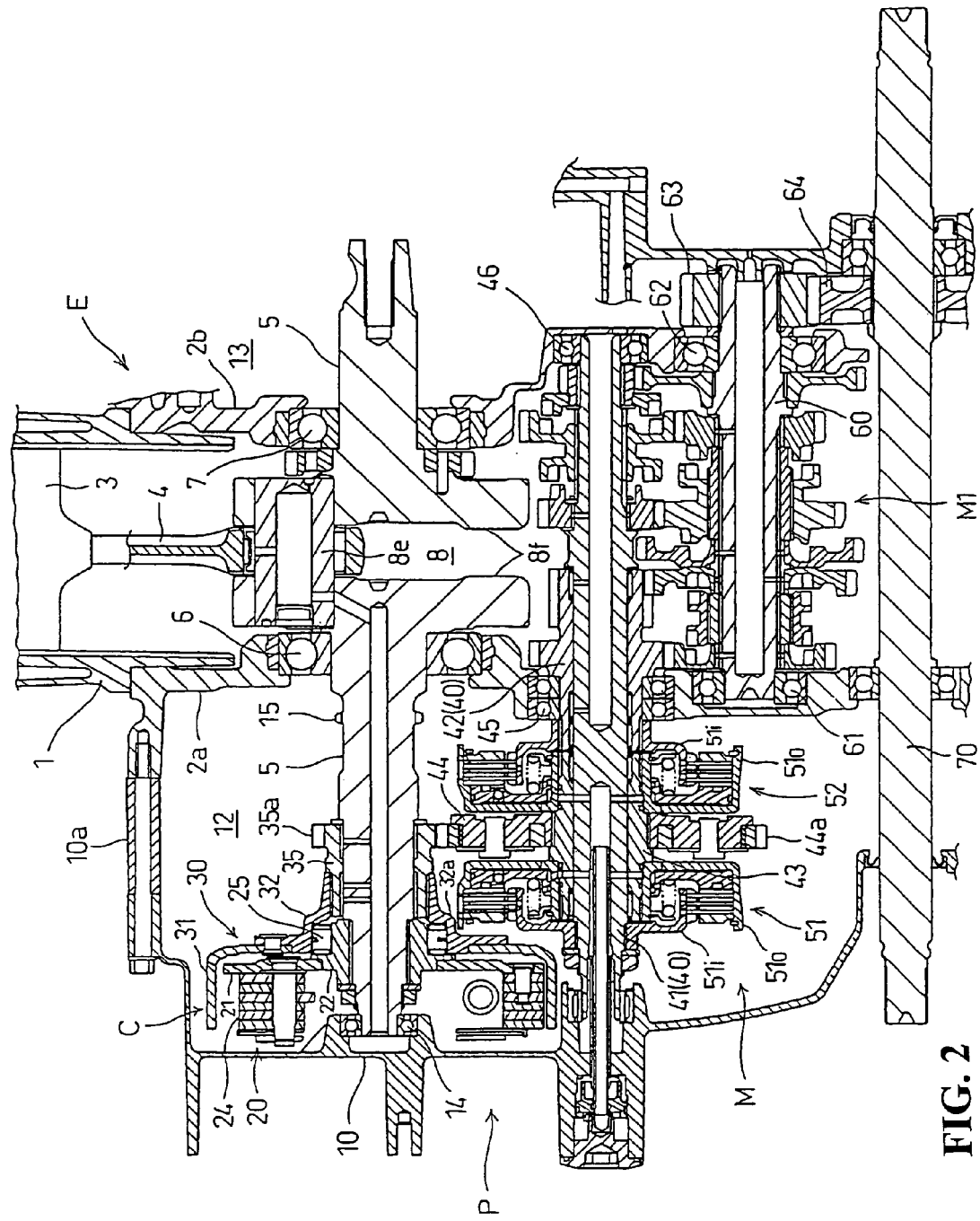
FIG. 2 is a general cross-sectional view taken along a line II-II in FIG. 1.

A general front view of a principal portion of the power unit P is shown in FIG. 1 and a general cross-sectional view taken along a line II-II in FIG. 1 will be shown in FIG. 2.

The power transmission device includes a constant-mesh gear transmission M which achieves a traveling transmission speed range by alternatively selecting a gear train from a transmission gear train group M1 (hereinafter referred to as "transmission M"). The starting clutch C is provided for transmitting and disconnecting a motive power generated by the internal combustion engine E with respect to the transmission M. A drive shaft 70 is provided to which the motive power obtained by shifting gears by the transmission M is transmitted.

The motive power of the drive shaft 70 is transmitted to a front wheel and a rear wheel respectively via a front propeller shaft and a rear propeller shaft. Thus, the wheels are driven to rotate.

The internal combustion engine E is a water-cooled single-cylinder four-stroke internal combustion engine that includes an engine body having a cylinder 1 to which a piston 3 is fitted so as to be capable of reciprocating. A cylinder head and a head cover are combined in sequence to the cylinder 1 in a superimposed manner. A crankcase 2 is provided to be combined to a lower end portion of the cylinder 1.

The crankcase 2 that is provided as a housing for rotatably supporting a crankshaft 5 which is oriented in the fore-and-aft direction of a vehicle body via a pair of main bearings 6, 7 that include two crankcase halves 2a, 2b divided in the axial direction of the crankshaft 5. In this case, a front crankcase half 2a and a rear crankcase half 2b that are combined with each other, whereby a crank chamber 8 for accommodating a crank pin 8e and a crank web 8f of the crankshaft 5 is defined.

The internal combustion engine E includes an intake valve and an exhaust valve which open and close an air intake port and an exhaust port provided on the cylinder head respectively. An overhead valve device is provided which opens and closes the intake valve and the exhaust valve by a push rode driven by a valve motion cam of a camshaft 9 synchronously with the rotation of the crankshaft 5.

The piston 3 is driven by a combustion pressure generated by an air-fuel mixture sucked through the air intake port burned in the combustion chamber defined between the piston 3 and the cylinder head, whereby the crankshaft 5 is driven to rotate via a connecting rod 4 and the crankpin 8e.

A front cover 10 covers the front crankcase half 2a and is combined therewith from the front via a spacer 10a, thereby defining a front storage chamber 12 with the front crankcase half 2a.

A front end 5a of the crank shaft 5 extending from the main bearing 6 held by the front crankcase half 2a to a front storage chamber 12 is rotatably supported by the front cover 10 via a bearing 14.

In the front storage chamber 12, the starting clutch C according to an embodiment of the invention, a primary speed-decreasing drive gear 35a, and a drive sprocket 15 which constitutes a valve power transmitting mechanism for driving the camshaft 9 to rotate are provided from the portion near the front end 5a toward the rear in sequence.

The rear side of the rear crankcase half 2b is covered by a rear cover (not shown), thereby defining a rear storage chamber 13. In the rear storage chamber 13, an alternating current generator, a drive transmission mechanism of a starter motor, a recoil starter, and so on are provided on the crankshaft 5, although not shown.

The starting clutch C provided on the front portion of the crankshaft 5 is configured in such a manner that a clutch inner 20 is secured in the vicinity of the front end of the crankshaft 5. In addition, a clutch outer 30 is rotatably supported by the crankshaft 5 integrally with the primary speed-decreasing drive gear 35a. Thus, the motive power is transmitted from the primary speed-decreasing drive gear 35a to the transmission M.

A main shaft 40 of the transmission M includes a first main shaft 41 and a second main shaft 42 which is fitted partly rotatably on the outer periphery of the first main shaft 41. In addition, the second main shaft 42 is rotatably supported by the front crankcase half 2a via a bearing 45 and the rear end of the first main shaft 41 is rotatably supported by the rear crankcase half 2b via a bearing 46.

An input sleeve 43 is rotatably fitted to the first main shaft 41 on the front side thereof in juxtaposition to the second main shaft 42 in the front storage chamber 12. A disk-shaped disk plate 44 is fitted to the center of the input sleeve 43. In addition, a speed-decreasing driven gear 44a that is provided on the outer periphery of the disk plate 44 meshes with the primary speed-decreasing drive gear 35a.

A first gear shift clutch 51 and a second gear shift clutch 52 are arranged in the front and the rear of the disk plate 44.

The first gear shift clutch 51 and the second gear shift clutch 52 are hydraulic multi-disk friction clutches that have the identical structure.

The first gear shift clutch 51 on the front side is located on the rear side of the starting clutch C adjacently thereto, a cup-shaped clutch outer 51o that opens toward the front is integrally fitted to the front side of the input sleeve 43. A clutch inner 51i is integrally fitted to the first main shaft 41.

On the other hand, with regard to the second gear shift clutch 52 on the rear side, a cup-shaped clutch outer 52o opening toward the rear is integrally fitted to the rear side of the input sleeve 43. In addition, a clutch inner 52i is integrally fitted to a portion of the second main shaft 42 extending forward with respect to the bearing 45 thereof.

Therefore, in a state in which the first gear shift clutch 51 is connected and the second gear shift clutch 52 is disconnected, a motive power inputted to the first speed-decreasing driven gear 44a is transmitted to the first main shaft 41 via the first gear shift clutch 51. In contrast, in a state in which the first gear shift clutch 51 is disconnected and the second gear shift clutch 52 is connected, the motive power is transmitted to the second main shaft 42 via the second gear-shift clutch 52.

The transmission gear train group M1, which is a group of gear trains for setting the transmission speed range, is arranged between the portions of the first main shaft 41 and the second main shaft 42 extending into the crank chamber 8 and a counter shaft 60 supported by bearings 61, 62 so as to extend in parallel therewith.

A secondary speed-decreasing drive gear 63 is fitted to a rear end of the counter shaft 60 projecting from the crank chamber 8 rearwardly into the rear storage chamber 13. A secondary speed-decreasing driven gear 64 is fitted to the drive shaft 70 that is arranged in parallel with the counter shaft 60 that meshes with the secondary speed-decreasing drive gear 63. Thus, the reduced motive power is transmitted to the drive shaft 70.

Figure 3:
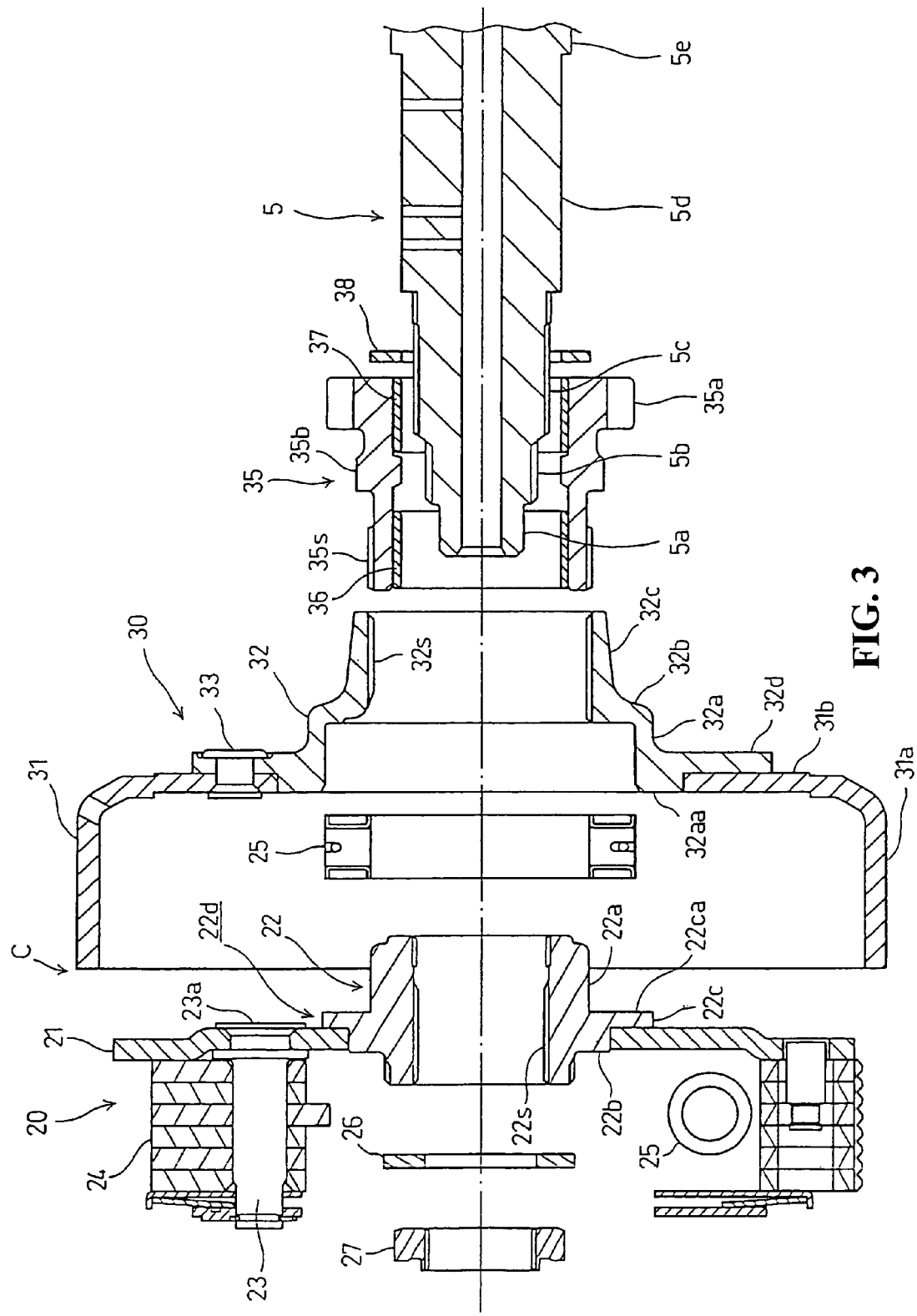
FIG. 3 is an exploded cross-sectional view of the starting clutch in the embodiment.
Figure 4:
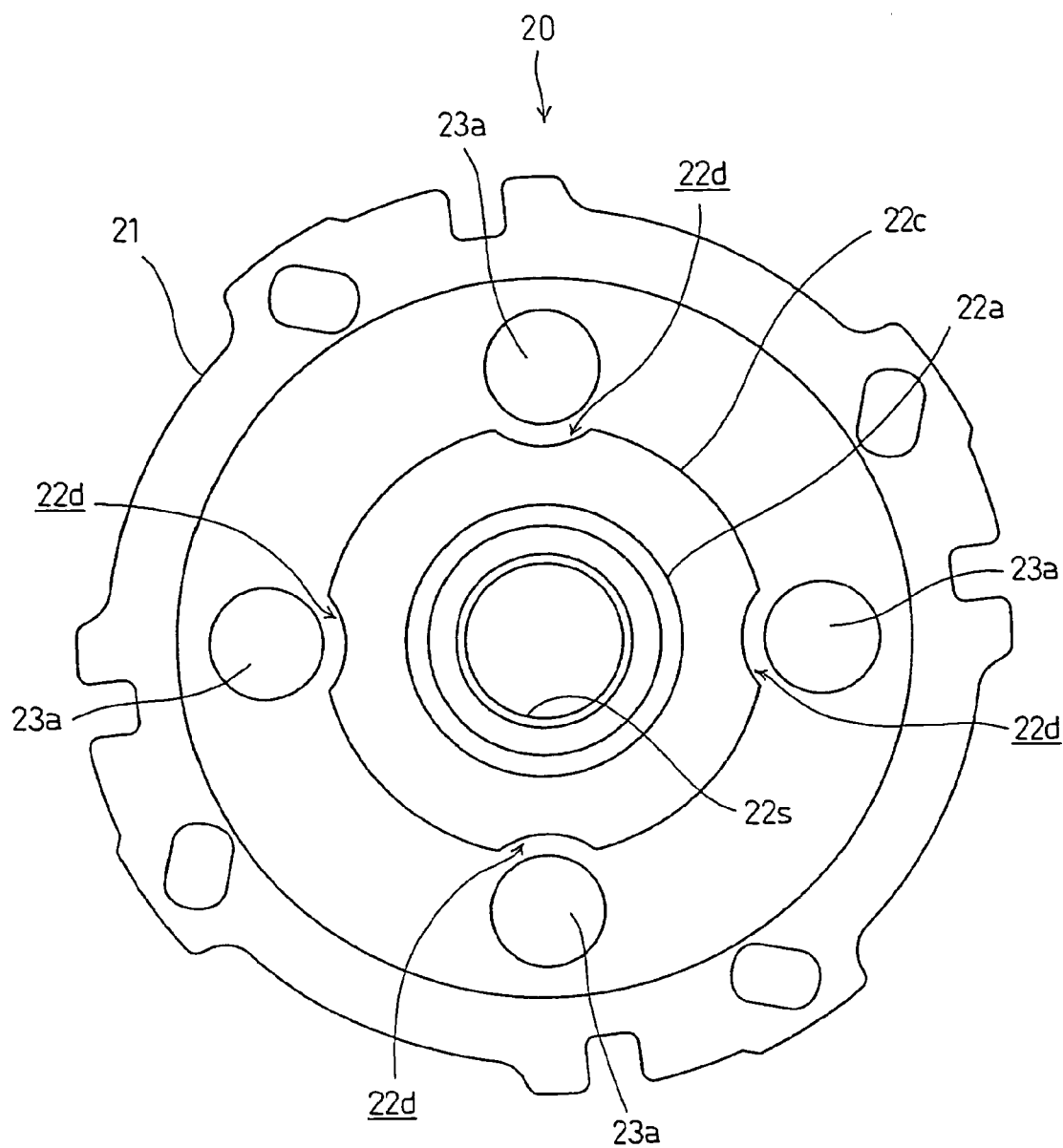
FIG. 4 is a rear view of a clutch inner of the same starting clutch.
Figure 5:
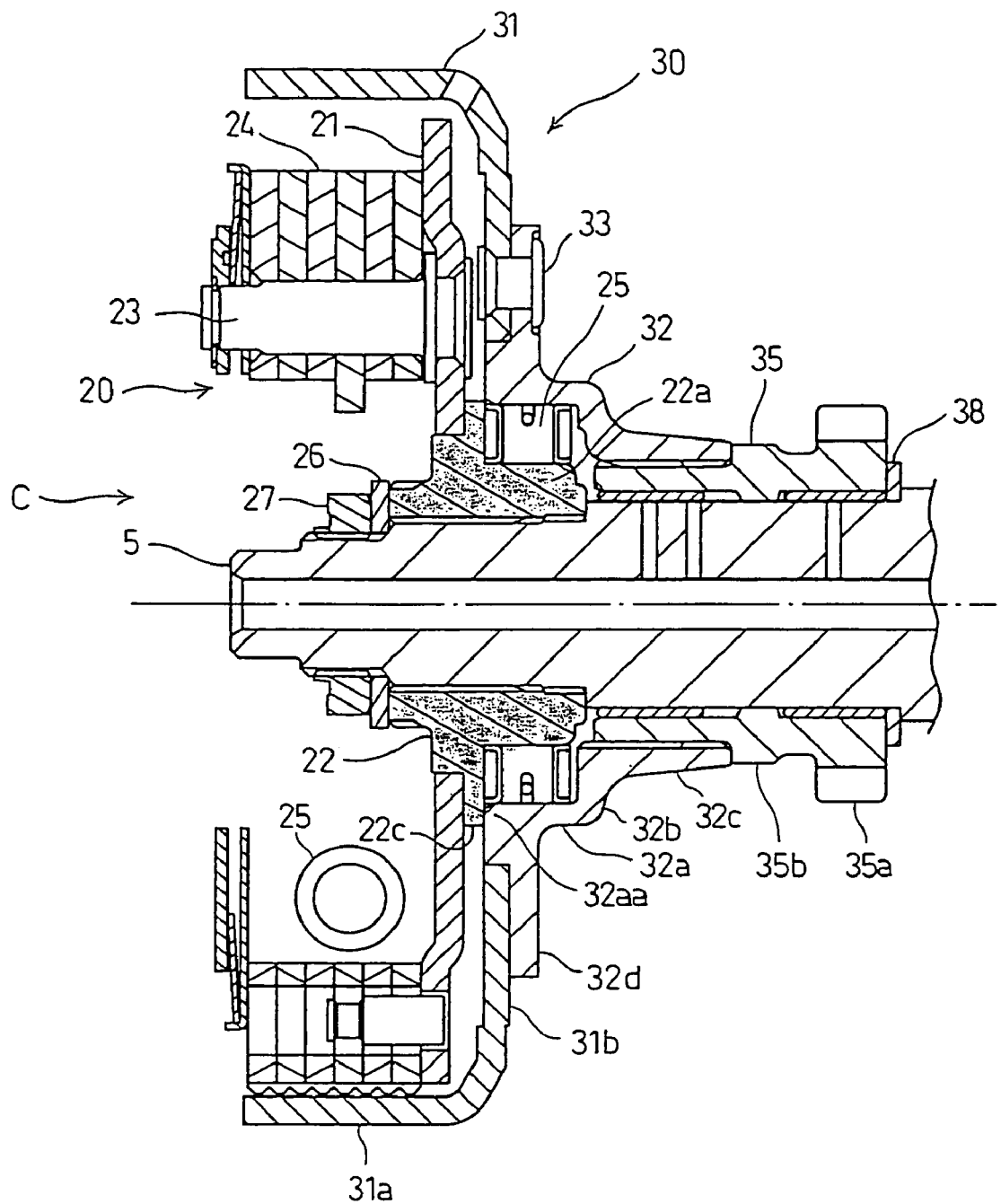
FIG. 5 is a cross-sectional view of the starting clutch after assembly.
Figure 6:
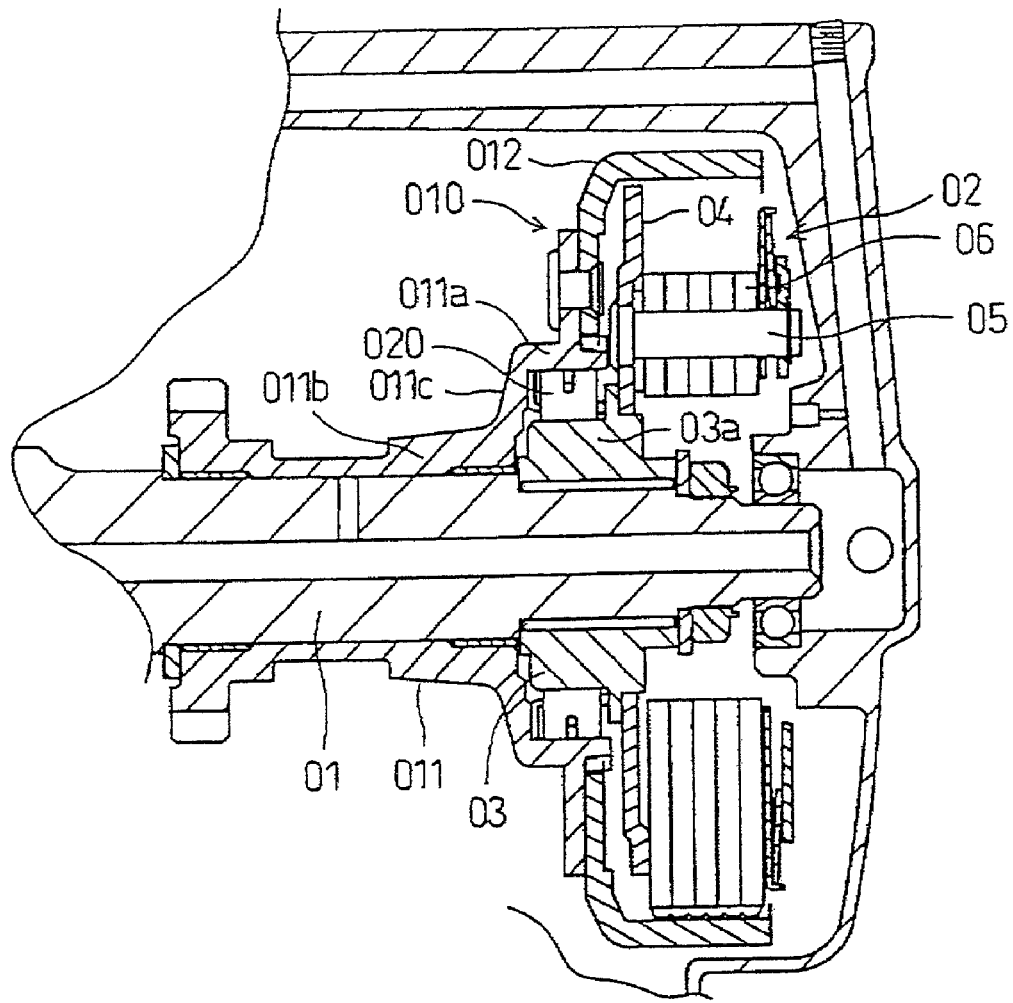
FIG. 6 is a cross-sectional view showing a structure of a starting clutch in the related art.

Referring now to FIG. 3 to FIG. 5, the structure and the assembly of the starting clutch C for controlling the transmission of the motive power from the crankshaft 5 to the transmission M will be described.

Referring now to FIG. 3, the front portion of the crankshaft 5 is formed with a male screw portion 5b, a serration formed portion 5c, a journal bearing portion 5d, and a large diameter portion 5e on the inner side, which corresponds to the center side of the crankshaft, in sequence from the front end 5a having the smallest diameter to be supported by the bearing 14 so as to increase stepwise in diameter.

In this embodiment, since the crankshaft is oriented in the fore-and-aft direction, in the front portion thereof, the center side of the crankshaft is referred to as a rear side rather than the inner side.

The starting clutch C is a centrifugal clutch, and the clutch inner 20 is configured in such a manner that a hollow disk-shaped drive plate 21 is secured to and supported by a drive plate boss 22.

The drive plate boss 22 includes a cylindrical portion 22a formed with a serration 22s on the inner peripheral edge so as to be fitted to the serration formed portion 5c of the crankshaft 5, and a projecting ridge 22b formed on the outer peripheral surface of the same cylindrical portion 22a in the circumferential direction. The rear portion of the projecting ridge 22b is further extends in the centrifugal direction to form a flange portion 22c along the circumferential direction, and the inner peripheral edge of the hollow disk-shaped drive plate 21 is integrally fitted to the front surface of the flange portion 22c and the outer peripheral surface of the projecting ridge 22b.

Pins 23 penetrating through the drive plate 21 from the rear side (the center side of the crankshaft 5) to the front side project toward the front, and are fixed thereto with enlarged head portions 23a at the rear ends thereof remained slightly rearwardly of the rear surface. A clutch shoe 24 is provided that is swingably supported by the forwardly projecting portions.

The pins 23 and the clutch shoes 24 are arranged at four positions on the drive plate 21 at regular intervals in the circumferential direction, and the respective clutch shoes 24 are urged by the coil spring 25 to swing toward the axial center.

The flange portion 22c extends further from the projecting ridge 22b of the drive plate boss 22 in the centrifugal direction and is formed with notches 22d at four positions of the outer peripheral edge thereof so as to avoid the head portions 23a of the four pins 23 remaining on the rear side of the rear surface of the drive plate 21 (see FIG. 4).

Therefore, downsizing of the clutch inner 20 is achieved by providing the pins 23 for supporting the clutch shoe 24 at a position closer to the center of the shaft. Thus, a weight reduction of the drive boss 22 can also be achieved.

The clutch outer 30 of the starting clutch C is configured in such a manner so that the inner peripheral portion of the hollow disk portion 31b of the cup-shaped clutch housing 31 including the annular portion 31a and the hollow disk-shaped portion 31b is integrally secured to a cylindrical clutch outer boss 32.

The clutch outer boss 32 is formed with a front cylindrical portion 32a having an outer diameter larger than the cylindrical portion 22a extending rearwardly of the drive boss 22, a rear cylindrical portion 32c reduced in diameter via a stepped portion 32b, and a flange portion 32d extending from an opening inner peripheral edge 32aa of the front cylindrical portion 32a in the centrifugal direction.

The rear cylindrical portion 32c is formed with a serration 32s on the inner peripheral surface thereof.

The front side of the outer peripheral end of the flange portion 32d is partly removed, so that the inner peripheral portion of the hollow disk portion 31b of the clutch housing 31 is fitted to the removed portion, whereby the flange portion 32d of the clutch outer boss 32 and the hollow disk portion 31b of the clutch housing 31 are secured with a rivet 33 so that the clutch housing 31 is integrally secured to the drive boss 22.

The hollow cup-shaped clutch housing 31 is secured to the clutch outer boss 32 in a posture opening toward the front, and the front surface of the opening inner peripheral portion 32aa of the clutch outer boss 32 (the side surface on the side of the end of the crankshaft) and the front surface of the hollow disk portion 31b of the clutch housing 31 are flush with each other.

Therefore, the clutch outer 31 can be positioned closer to the drive plate 21 of the clutch inner 20, so that the axial width of the starting clutch C can be reduced. Thus, the starting clutch C can be downsized.

The primary speed-decreasing drive gear 35a is formed at the rear end of a clutch outer sleeve 35 which is fitted into the rear cylindrical portion 32c of the clutch outer boss 32 and rotates integrally therewith.

The clutch outer sleeve 35, that is rotatably supported by the journal bearing portion 5d of the crankshaft 5 via the journal bearings 36, 37, is formed with a serration 35s on the outer peripheral surface of the front portion thereof, and is formed with an enlarged portion 35b at the center portion thereof.

The front portion of the clutch outer sleeve 35 with respect to the enlarged portion 35b is inserted into the rear cylindrical portion 32c of the clutch outer boss 32, and the serration 35s on the outer peripheral surface of the clutch outer sleeve 35 and the serration 32s on the inner peripheral surface of the clutch outer boss 32 are fitted to each other, so that the clutch outer sleeve 35 rotates integrally with the clutch outer boss 32 and the clutch housing 31.

A one-way clutch 25 is interposed between the clutch outer 30 and the clutch inner 20.

The one-way clutch 25 has an inner diameter substantially the same as the outer diameter of the cylindrical portion 22a extending rearwardly of the drive plate boss 22 of the clutch inner 20 with an outer diameter substantially the same as the inner diameter of the front cylindrical portion 32a of the clutch outer boss 32 of the clutch outer 30, and is interposed between the cylindrical portion 22a of the drive plate boss 22 and the front cylindrical portion 32a of the clutch outer boss 32.

The procedure for assembling the clutch inner 20 and the clutch outer 30 to the crankshaft 5 is as follows. A washer 38 is firstly fitted to the journal bearing portion 5d of the crankshaft 5, and then the clutch outer sleeve 35 is rotatably fitted thereto via the journal bearings 36, 37.

Then, the rear cylindrical portion 32c having the serration 32s on the inner peripheral surface of the clutch outer boss 32 and integrally secured to the clutch housing 31 is fitted to the front portion of the clutch outer sleeve 35 having the serration 35s on the outer peripheral surface thereof.

The cylindrical portion 22a extending rearwardly from the drive plate boss 22 of the clutch inner 20 is press-fitted to the one-way clutch 25 which is press-fitted into the front cylindrical portion 32a of the clutch outer boss 32, so that the drive plate boss 22 is fitted to the serration formed portion 5c of the crankshaft 5 via the serrations.

The clutch inner 20 is accommodated in the cup-shaped clutch housing 31 of the clutch outer 30.

A nut member 27 is screwed into the male screw portion 5b of the crankshaft 5 with the intermediary of the washer 26.

By screwing the nut member 27, the drive plate boss 22 of the clutch inner 20 is pressed against the front end surface of the journal bearing portion 5d of the crankshaft 5 via the washer 26 and is thereby secured to the crankshaft 5 integrally therewith.

The starting clutch C assembled in this manner is shown in FIG. 5.

When the crankshaft 5 rotates by the operation of the internal combustion engine E and hence the number of revolutions of the engine is increased, the clutch shoe 24 of the clutch inner 20 that rotated integrally with the starting clutch C is swung in the centrifugal direction, and comes into sliding contact with the inner peripheral surface of the annular portion 31a of the clutch outer 30. When the number of revolutions exceeds a predetermined value, the clutch outer 30 is integrally rotated to bring the starting clutch C into the contact state, whereby the motive power is transmitted to the transmission M.

In contrast to the clutch inner 20 secured to the serration formed portion 5c in the vicinity of the end of the crankshaft 5, the clutch outer 30 which is rotatably fitted to the journal bearing portion 5d of the crankshaft 5 receives a thrust force in the axial direction, and the rear surface of the flange portion 22c of the drive plate boss 22 receives abutment of the opening inner peripheral edge 32aa of the clutch outer boss 32 as a thrust receiving surface 22ca.

Since the configuration is such that the thrust receiving surface 22ca is provided over a portion of the flange portion 22c extending from the drive plate boss 22 in the centrifugal direction beyond the outer periphery of the one-way clutch 25 for receiving the thrust force of the clutch outer 30, it is not necessary to receive the thrust by increasing the outer diameter of the cylindrical portion of the drive plate boss on the radially inside with respect to the one-way clutch 25. Thus, the diameter of the one-way clutch 25 and the outer diameter of the front cylindrical portion 32a of the clutch outer boss 32 can be reduced, whereby upsizing of the internal combustion engine can be restrained.

In other words, as shown in FIG. 2, since the first gear shift clutch 51 is disposed along the rear surface of the clutch housing 31 of the clutch outer 30 in the starting clutch C, and the starting clutch C and the first gear shift clutch 51 are overlapped partly with each other when viewed in the axial direction (see FIG. 1), so that the main shaft 40 can be arranged near the crankshaft 5 without interference of the first gear shift clutch 51 with the front cylindrical portion 32a of the clutch outer boss 32, which is reduced in outer diameter. Thus, a downsizing of the internal combustion engine can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A starting clutch is provided coaxially with a crankshaft and is capable of transmitting a motive power of the crankshaft to a transmission device via a gear comprising:

a disk-shaped drive plate of a clutch inner secured to and supported by a drive plate boss which is fitted to the crankshaft near an end thereof;

a one-way clutch is fitted to an outer periphery of a cylindrical portion extending inwardly, which corresponds to a center side of the crankshaft of the drive plate boss; and a clutch outer forming a cup shape by an annular portion which covers an outer periphery of the drive plate and a hollow disk portion which covers an inner surface is rotatably supported by the crankshaft;

wherein the one-way clutch is clamped by an inner peripheral edge of the hollow disk portion of the clutch outer from an outer peripheral side in cooperation with a cylindrical portion of the drive plate boss, and wherein an inner peripheral edge of the hollow disk portion of the clutch outer abuts against a flange portion of the drive plate boss extending along an inner surface of the drive plate in a centrifugal direction thereof.

2. The starting clutch according to claim 1, wherein a clutch shoe is supported by a pin projecting from the drive plate so as to penetrate therethrough from an inner side, which corresponds to the center side of the crankshaft, to an outer side of the crankshaft, and the flange portion extending from the drive plate boss in the centrifugal direction is formed with a notch at an outer peripheral edge thereof so as to avoid a head portion of the pin slightly projecting inwardly of the drive plate.

3. The starting clutch according to claim 1, wherein the clutch outer is configured in such a manner that the inner peripheral portion of the hollow cup-shaped clutch housing is integrally secured to a cylindrical clutch outer boss, an outer cylindrical portion of the clutch outer boss corresponds to the inner peripheral edge of the hollow disk portion of the clutch outer, and an outer end surface of the outer cylindrical portion of the same clutch outer boss and an outer surface of the hollow disk portion of the clutch housing are flush with each other.

4. The starting clutch according to claim 2, wherein the clutch outer is configured in such a manner that the inner peripheral portion of the hollow cup-shaped clutch housing is integrally secured to a cylindrical clutch outer boss, an outer cylindrical portion of the clutch outer boss corresponds to the inner peripheral edge of the hollow disk portion of the clutch outer, and an outer end surface of the outer cylindrical portion of the same clutch outer boss and an outer surface of the hollow disk portion of the clutch housing are flush with each other.

5. The starting clutch according to claim 1, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

6. The starting clutch according to claim 2, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

7. The starting clutch according to claim 3, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

8. A starting clutch coaxially mounted relative to a crankshaft for transmitting a motive power of the crankshaft to a transmission device via a gear comprising:

a clutch inner secured to and supported by a drive plate boss which is fitted to the crankshaft near an end thereof, said clutch inner including a disk-shaped drive plate;

a one-way clutch fitted to an outer periphery of a cylindrical portion extending inwardly, which corresponds to a center side of the crankshaft of the drive plate boss; and a clutch outer forming a cup shape by an annular portion for covering an outer periphery of the drive plate and a hollow disk portion for covering the inner surface, said clutch outer being rotatably supported by the crankshaft;

said one-way clutch is clamped by an inner peripheral edge of the hollow disk portion of the clutch outer from an outer peripheral side in cooperation with a cylindrical portion of the drive plate boss, and an inner peripheral edge of the hollow disk portion of the clutch outer abuts against a flange portion of the drive plate boss extending along an inner surface of the drive plate in a centrifugal direction thereof.

9. The starting clutch according to claim 8, wherein a clutch shoe is supported by a pin projecting from the drive plate so as to penetrate therethrough from an inner side, which corresponds to the center side of the crankshaft, to an outer side of the crankshaft, and the flange portion extending from the drive plate boss in the centrifugal direction is formed with a notch at an outer peripheral edge thereof so as to avoid a head portion of the pin slightly projecting inwardly of the drive plate.

10. The starting clutch according to claim 8, wherein the clutch outer is configured in such a manner that the inner peripheral portion of the hollow cup-shaped clutch housing is integrally secured to a cylindrical clutch outer boss, an outer cylindrical portion of the clutch outer boss corresponds to the inner peripheral edge of the hollow disk portion of the clutch outer, and an outer end surface of the outer cylindrical portion of the same clutch outer boss and an outer surface of the hollow disk portion of the clutch housing are flush with each other.

11. The starting clutch according to claim 9, wherein the clutch outer is configured in such a manner that the inner peripheral portion of the hollow cup-shaped clutch housing is integrally secured to a cylindrical clutch outer boss, an outer cylindrical portion of the clutch outer boss corresponds to the inner peripheral edge of the hollow disk portion of the clutch outer, and an outer end surface of the outer cylindrical portion of the same clutch outer boss and an outer surface of the hollow disk portion of the clutch housing are flush with each other.

12. The starting clutch according to claim 8, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

13. The starting clutch according to claim 9, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

14. The starting clutch according to claim 10, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

15. A starting clutch adapted to be mounted coaxially with a crankshaft and adapted for transmitting a motive power of the crankshaft to a transmission device via a gear comprising:

a clutch inner secured to and supported by a drive plate boss which is adapted to be fitted to the crankshaft near an end thereof, said clutch inner including a disk-shaped drive plate;

a one-way clutch adapted to be fitted to an outer periphery of a cylindrical portion extending inwardly; and a clutch outer forming a cup shape by an annular portion for covering an outer periphery of the drive plate and a hollow disk portion for covering an inner surface is adapted to be rotatably supported by the crankshaft;

said one-way clutch is clamped by an inner peripheral edge of the hollow disk portion of the clutch outer from the outer peripheral side in cooperation with a cylindrical portion of the drive plate boss, wherein the inner peripheral edge of the hollow disk portion of the clutch outer abuts against a flange portion of the drive plate boss extending along an inner surface of the drive plate in a centrifugal direction thereof.

16. The starting clutch according to claim 15, wherein a clutch shoe is supported by a pin projecting from the drive plate so as to penetrate therethrough from an inner side, which corresponds to the center side of the crankshaft, to an outer side of the crankshaft, and the flange portion extending from the drive plate boss in the centrifugal direction is formed with a notch at an outer peripheral edge thereof so as to avoid a head portion of the pin slightly projecting inwardly of the drive plate.

17. The starting clutch according to claim 15, wherein the clutch outer is configured in such a manner that the inner peripheral portion of the hollow cup-shaped clutch housing is integrally secured to a cylindrical clutch outer boss, an outer cylindrical portion of the clutch outer boss corresponds to the inner peripheral edge of the hollow disk portion of the clutch outer, and an outer end surface of the outer cylindrical portion of the same clutch outer boss and an outer surface of the hollow disk portion of the clutch housing are flush with each other.

18. The starting clutch according to claim 16, wherein the clutch outer is configured in such a manner that the inner peripheral portion of the hollow cup-shaped clutch housing is integrally secured to a cylindrical clutch outer boss, an outer cylindrical portion of the clutch outer boss corresponds to the inner peripheral edge of the hollow disk portion of the clutch outer, and an outer end surface of the outer cylindrical portion of the same clutch outer boss and an outer surface of the hollow disk portion of the clutch housing are flush with each other.

19. The starting clutch according to claim 15, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

20. The starting clutch according to claim 16, wherein a gear shift clutch provided on a main shaft of the transmission device extending in parallel to the crankshaft is disposed along an inner surface of the hollow disk portion of the clutch outer, and the gear shift clutch and the clutch outer is partly overlapped with each other when viewed in an axial direction.

\* \* \* \* \*